United States Patent
Kim et al.

(10) Patent No.: US 10,278,196 B2
(45) Date of Patent: *Apr. 30, 2019

(54) METHOD FOR DATA SCHEDULING AND POWER CONTROL AND ELECTRONIC DEVICE THEREOF

(71) Applicant: Samsung Electronics Co., Ltd., Gyeonggi-do (KR)

(72) Inventors: Dong-Hyun Kim, Seoul (KR); Seong-Wook Song, Seoul (KR); Jong-Han Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,448

(22) Filed: Dec. 15, 2017

(65) Prior Publication Data
US 2018/0110055 A1    Apr. 19, 2018

Related U.S. Application Data

(63) Continuation of application No. 14/853,429, filed on Sep. 14, 2015, now Pat. No. 9,848,431.

(30) Foreign Application Priority Data

Nov. 25, 2014   (KR) ........................ 10-2014-0165263

(51) Int. Cl.
| | |
|---|---|
| *H04W 72/08* | (2009.01) |
| *H04L 5/00* | (2006.01) |
| *H04W 56/00* | (2009.01) |
| *H04B 17/373* | (2015.01) |
| *H04W 88/04* | (2009.01) |

(Continued)

(52) U.S. Cl.
CPC ........ *H04W 72/085* (2013.01); *H04B 17/373* (2015.01); *H04L 5/0057* (2013.01); *H04W 56/001* (2013.01); *H04L 5/0048* (2013.01); *H04W 52/223* (2013.01);
(Continued)

(58) Field of Classification Search
CPC . H04W 72/085; H04W 72/08; H04W 56/001; H04W 52/241; H04W 88/04; H04W 52/223
See application file for complete search history.

(56) References Cited

U.S. PATENT DOCUMENTS

| | | |
|---|---|---|
| 5,799,256 A | 8/1998 | Pombo et al. |
| 6,308,043 B1 | 10/2001 | Solheim et al. |

(Continued)

FOREIGN PATENT DOCUMENTS

EP    2 362 706    2/2010

*Primary Examiner* — Chi Ho A Lee
(74) *Attorney, Agent, or Firm* — The Farrell Law Firm, P.C.

(57) ABSTRACT

Methods and apparatuses are provided for operating a first terminal. A motion of the first terminal is determined by using sensor data from at least one sensor of the first terminal. A prediction for a channel quality between the first terminal and a second terminal is performed based on the determined motion of the first terminal. At least one first time duration in which the predicted channel quality is greater than or equal to a threshold value and at least one second time duration in which the predicted channel quality is less than the threshold value are determined. Data is transmitted to the second terminal via a first transmission power, where the first transmission power is set for the at least one first time duration.

20 Claims, 10 Drawing Sheets

(51) Int. Cl.
  *H04W 72/04*   (2009.01)
  *H04W 52/22*   (2009.01)
  *H04W 52/24*   (2009.01)
  *H04W 52/28*   (2009.01)

(52) U.S. Cl.
  CPC ........ *H04W 52/241* (2013.01); *H04W 52/285* (2013.01); *H04W 72/048* (2013.01); *H04W 88/04* (2013.01)

(56) References Cited

U.S. PATENT DOCUMENTS

| | | |
|---|---|---|
| 6,519,705 B1 | 2/2003 | Leung |
| 7,505,252 B2 | 3/2009 | Ma |
| 7,894,820 B2 | 2/2011 | Li et al. |
| 2011/0140874 A1 | 6/2011 | Tauchi |
| 2012/0092991 A1 | 4/2012 | Jeong et al. |
| 2012/0102214 A1 | 4/2012 | Pelton et al. |
| 2013/0246778 A1 | 9/2013 | Nikara |
| 2014/0036999 A1 | 2/2014 | Ryu et al. |
| 2014/0105749 A1 | 4/2014 | Pellenc |
| 2014/0156834 A1 | 6/2014 | Wyld et al. |
| 2014/0171141 A1 | 6/2014 | Niskala |
| 2014/0334796 A1 | 11/2014 | Galant |
| 2015/0048976 A1 | 2/2015 | Petersen |
| 2015/0128033 A1 | 5/2015 | Li |
| 2015/0138988 A1 | 5/2015 | Shaw |
| 2015/0365841 A1 | 12/2015 | Wilhelmsson |
| 2016/0066247 A1 | 3/2016 | Villasenor |
| 2016/0142255 A1 | 5/2016 | Reina |

METHOD FOR DATA SCHEDULING AND POWER CONTROL AND ELECTRONIC DEVICE THEREOF

PRIORITY

This application is a Continuation Application of U.S. application Ser. No. 14/853,429 filed in the U.S. Patent and Trademark Office on Sep. 14, 2015, which claims priority under 35 U.S.C. § 119(a) to a Korean Patent Application filed on Nov. 25, 2014 in the Korean Intellectual Property Office and assigned Serial No. 10-2014-0165263, the entire content of which is incorporated herein by reference.

BACKGROUND

1. Field of the Disclosure

The present disclosure relates generally to a method of performing data scheduling and power control on a basis of channel quality between two predicted electronic devices and an electronic device thereof and, more particularly, to a method and apparatus for channel estimation between a wearable device attached to the body of a user and an electronic device directly connected to the wearable device.

2. Description of the Related Art

With the development and popularization of smartphone technology, in recent years, a wearable device is identified as the next generation mobile computing technology. A wearable device corresponds to an electronic device which can communicate with a user at the closest location to the body of the user while being attached to the body of the user in various forms such as a watch, glasses, etc. The wearable device has an advantage in that the wearable device can consistently collect detailed information on a surrounding environment or a change in the body of a person in real-time. For example, smart glasses can record information on visible surroundings, and smart underwear can consistently collect a biometric signal such as a body temperature and a heartbeat.

It is predicted that such a wearable device will play an important role in monitoring for health care. Further, to this end, a wearable device is being developed toward a form of a sensor having a communication function while deviating from a form of a watch or glasses and being worn on various body parts.

In addition, a wearable device provides sensor data (e.g., temperature, pressure, and the number of heartbeats, as information corresponding to a signal detected by a sensor) to a smartphone through Bluetooth (BT) communication or Wireless Fidelity (Wi-Fi) Direct, so that the sensor data can be recorded in a storage medium inside the smartphone. Further, the wearable device provides sensor data to a server within a network through a cellular communication scheme (e.g., Long Term Evolution (LTE), Long Term Evolution-Advanced (LTE-A), Code Division Multiple Access (CDMA), Wideband Code Division Multiple Access (WCDMA), Universal Mobile Telephone System (UMTS), etc.), so that the sensor data can be stored in the server.

Conventionally, in general, when data is transmitted/received on the basis of a cellular communication scheme, channel quality is estimated between a base station and a terminal (hereinafter, referred to as channel estimation), and the estimated channel is used for data reception. However, in a case of the cellular communication scheme, the channel estimation is continuously performed using a common pilot channel, so that it is possible to perform consistent channel estimation. However, in a case of direct communication between devices using Bluetooth communication or Peer to Peer (P2P) communication, since a pilot symbol and data are discontinuously transmitted, it may be difficult to perform continuous channel estimation between two devices. Further, even in a case of the cellular communication scheme, it may be difficult to perform channel estimation in a channel environment in which a user moves at a low speed due to limitations of a structure of a pilot symbol and an estimation method.

Thus, an efficient channel estimation technology is required between a wearable device which is attached to the body of a user and is influenced by periodic movement (e.g., jogging, walking, etc.,) of the user and an electronic device directly connected to the wearable device.

SUMMARY

The present disclosure has been made to address the above-mentioned problems and disadvantages and to provide at least the advantages described below.

Accordingly, an aspect of the present disclosure provides a method and apparatus for channel estimation between a wearable device attached to a body of a user and an electronic device directly connected to the wearable device.

Another aspect of the present disclosure provides a method and apparatus for providing continuous channel quality through channel quality prediction in a section where channel estimation cannot be performed when discontinuous channel estimation is performed between a wearable device attached to a body of a user and an electronic device directly connected to the wearable device.

Another aspect of the present disclosure provides a method of determining information on user movement detected by a sensor module and predicting a state of a wireless channel according to the user movement, thereby improving a data transmission success probability and minimizing power consumption of a device, and an electronic device thereof.

In accordance with various embodiments of the present disclosure, a method of operating a first terminal is provided. A motion of the first terminal is determined by using sensor data from at least one sensor of the first terminal. A prediction for a channel quality between the first terminal and a second terminal is performed based on the determined motion of the first terminal. At least one first time duration in which the predicted channel quality is greater than or equal to a threshold value and at least one second time duration in which the predicted channel quality is less than the threshold value are determined. Data is transmitted to the second terminal via a first transmission power, where the first transmission power is set for the at least one first time duration.

In accordance with various embodiments of the present disclosure, a first terminal is provided that includes at least one sensor, and a channel quality prediction module configured to determine the motion of the first terminal by using sensor data from the at least one sensor of the first terminal. The channel quality prediction module is also configured to perform a prediction for a channel quality between the first terminal and a second terminal based on the determined motion of the first terminal. The channel quality prediction module is further configured to determine at least one first time duration in which the predicted channel quality is greater than or equal to a threshold value and at least one second time duration in which the predicted channel quality is less than the threshold value. The first terminal also includes a wireless communication module configured to transmit, to the second terminal, data via a first transmission power, where the first transmission power is set for the at least one first time duration.

In accordance with various embodiments of the present disclosure, a first chip set is provided that includes a sensor module configured to detect a motion of the first chip set, and a channel quality prediction module configured to determine a motion of the first chip set by using sensor data from the sensor module of the first chip set. The channel quality prediction module is also configured to perform a prediction for a channel quality between the first chip set and a second chip set based on the determined motion of the first chip set, and determine at least one first time duration in which the predicted channel quality is greater than or equal to a threshold value and at least one second time duration in which the predicted channel quality is less than the threshold value. The first chip set also includes a wireless communication module configured to transmit, to the second chip set, data via a first transmission power, where the first transmission power is set for the at least one first time duration.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
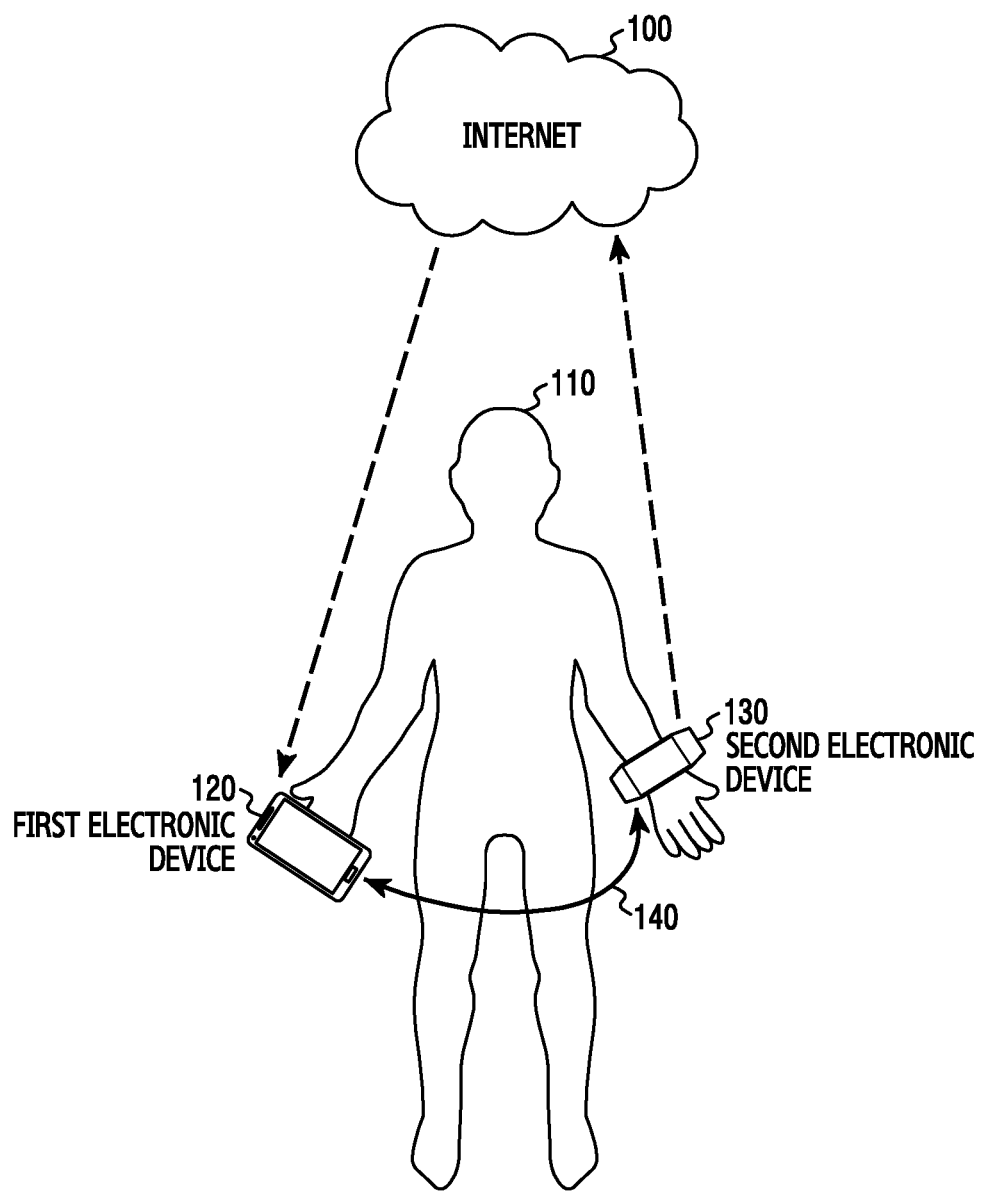
FIG. 1 illustrates a scenario where two electronic devices perform communication while being attached to the body of a user according to an embodiment of the present disclosure.

Hereinafter, various embodiments of the present disclosure are described with reference to the accompanying drawings. The present disclosure may be modified in various forms and include various embodiments, but certain embodiments are illustrated in the accompanying drawings and described in the description below. However, the description is not intended to limit the present disclosure to the certain embodiments, and it shall be appreciated that all the changes, equivalents and substitutions belonging to the idea and technical scope of the present disclosure are included in the present disclosure. In the description of the accompanying drawings, identical or similar reference numerals are used to designate identical or similar elements.

The terms "include" and "may include" refer to the existence of a corresponding disclosed function, operation or component which can be used in various embodiments of the present disclosure and do not limit one or more additional functions, operations, or components. In the present disclosure, the terms "include" and "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all combinations of the listed words. For example, the expression "A or B" may include A, B, or both A and B.

The expressions "1," "2," "first," and "second" used in various embodiments of the present disclosure may modify various components of various embodiments but do not limit the corresponding components. For example, the above expressions do not limit the sequence and/or importance of the corresponding constituent elements. The above expressions are used merely for the purpose of distinguishing an element from the other elements. For example, a first user device and a second user device indicate different user devices although both of them are user devices. For example, without departing from the scope of the present disclosure, a first structural element may be referred to as a second structural element. Similarly, the second structural element also may be referred to as the first structural element.

It should be noted that if it is described that one component is "coupled" or "connected" to another component, the first component may be directly coupled or connected to the second component, and a third component may be "coupled" or "connected" between the first and second components. Conversely, when one component is "directly coupled" or "directly connected" to another component, it may be construed that a third component does not exist between the first component and the second component.

The terms in various embodiments of the present disclosure are used to describe a certain embodiment, and are not intended to limit the present disclosure. As used herein, the singular forms are intended to include the plural forms as well, unless the context clearly indicates otherwise.

Unless defined differently, all terms used herein, which include technical terms or scientific terms, have the same meaning as that understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet Personal Computer (PCs), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical device, a camera, a wearable device (e.g., Head-Mounted-Device (HMD) such as electronic glasses, electronic clothes, an electronic bracelet, an electronic necklace, an electronic appcessory, an electronic tattoo, or a smart watch).

According to an embodiment of the present disclosure, the electronic device may be a smart home appliance with a communication function. The smart home appliance as an example of the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to an embodiment of the present disclosure, the electronic device may include at least one of various medical appliances (e.g. a Magnetic Resonance Angiography (MRA) device, a Magnetic Resonance Imaging (MRI) device, a Computed Tomography (CT) machine, and an ultrasonic machine), navigation devices, Global Positioning System (GPS) receivers, Event Data Recorders (EDRs), Flight Data Recorders (FDRs), automotive infortainment devices, electronic equipment for ships (e.g. navigation equipment for ships, gyrocompasses, or the like), avionics, security devices, head units for vehicles, industrial or home robots, Automatic Teller Machines (ATM) of banking facilities, and Point Of Sales (POSs) of vendors.

According to an embodiment of the present disclosure, the electronic devices may include at least one of furniture or a part of a building/structure having a communication function, electronic boards, electronic signature receiving devices, projectors, or various measuring equipment (e.g., equipment for a water supply, electricity, gas or radio waves). An electronic device according to various embodiments of the present disclosure may be a combination of one or more of the above described various devices. Also, an electronic device according to various embodiments of the present disclosure may be a flexible device. Also, an electronic device according to various embodiments of the present disclosure is not limited to the above described devices.

Hereinafter, an electronic device according to various embodiments of the present disclosure is described with reference to the accompanying drawings. The term "user" used in various embodiments of the present disclosure may refer to a person who uses an electronic device or a device (for example, an artificial intelligence electronic device) that uses an electronic device.

Hereinafter, various embodiments of the present disclosure relate to an electronic device for performing data scheduling and power control on the basis of channel quality between two predicted electronic devices and a method of operating the electronic device.

FIG. 1 illustrates a scenario where two electronic devices perform communication while being attached to a certain location of the body of a user or near the body of the user according to an embodiment of the present disclosure.

Referring to FIG. 1, a user 110 has a first electronic device 120 (e.g., a smartphone) gripped by a right hand thereof and a second electronic device 130 (e.g., a wearable device) worn on a left wrist thereof. In this case, the first electronic device 120 and the second electronic device 130 can perform direct communication or Peer to Peer (P2P) communication between devices on the basis of a Bluetooth communication scheme or using a WiFi-Direct function. However, in various embodiments of the present disclosure, the direct communication or the P2P communication between devices is not limited to the Bluetooth communication scheme or the WiFi-Direct function, and various P2P communication schemes may be employed for the communication.

The second electronic device 130 collects information relating to a health state (e.g., the number of heartbeats, a pulse, blood pressure, etc.) of the user 110 through a sensor and then periodically or aperiodically transmits the information to the first electronic device 120 using a P2P communication scheme.

In an embodiment of the present disclosure, the second electronic device 130 can periodically or aperiodically transmit the collected information relating to the health state of the user 110 to the first electronic device 120 using a cloud service through the Internet 100. The second electronic device 130 can be connected to the Internet 100 through a cellular communication network or a WLAN in order to use the Internet 100.

In an embodiment of the present disclosure, the first electronic device 120 transmits information indicating text message reception notification or paging reception notification to the second electronic device 130 when receiving a text message or a page through a base station. Then, the second electronic device 130 outputs the text message reception notification or the paging reception notification transmitted from the first electronic device 120 through a sound or a screen.

In general, in order to provide data to the first electronic device 120, when the second electronic device 130 transmits data to a base station (e.g. a network entity of a cellular communication network), if a state of a wireless channel between the base station and the second electronic device 130 is poor, a probability that the transmission fails may be high and power consumption caused by retransmission may increase. Thus, in a cellular communication, a channel is estimated consistently and information on the estimated channel is fed back to a transmission port, so that it is possible to perform stable transmission through adjusting transmission power and adjusting a modulation scheme. However, in the case of a cellular communication scheme, the channel estimation is continuously performed using a common pilot channel, so that it is possible to perform periodic channel estimation. However, in the case of direct communication between devices using Bluetooth communication or P2P communication, since a pilot symbol and data are discontinuously transmitted, it may be difficult to perform consistent channel estimation between two devices.

Thus, various embodiments of the present disclosure can predict channel quality of a section where channel estimation is impossible and can effectively predict the channel quality even when a channel quality is poor, using a relationship between a change in a signal intensity of a channel between the first electronic device 120 and the second electronic device 130 (see FIG. 7) and a change in a detection signal in a sensor module of the second electronic device 130 (see FIG. 8), which result from movement, e.g., walking or jogging, of the user 110.

The first electronic device 120 or the second electronic device 130 can determine whether transmission is performed or not, using the predicted channel quality, when a data transmission event is generated.

Otherwise, in an embodiment of the present disclosure, the first electronic device 120 or the second electronic device 130 can determine a transmission interval in advance using the predicted channel quality regardless of a data transmission event.

Otherwise, in an embodiment of the present disclosure, the first electronic device 120 or the second electronic device 130 can perform effective power control using the predicted channel quality.

Therefore, the first electronic device 120 or the second electronic device 130 transmits data on the basis of the predicted channel quality, thereby performing stable data transmission and power control.

In an embodiment of the present disclosure, when the first electronic device 120 transmits data or a control signal to the second electronic device 130 through a P2P connection 140, the first electronic device 120 can predict channel quality of a channel between the first electronic device 120 and the second electronic device 130, and then determine transmission-or-not or transmission power using the predicted channel quality.

In an embodiment of the present disclosure, when the second electronic device 130 transmits data or a control signal to the first electronic device 120 through the P2P connection 140, the second electronic device 130 can predict channel quality of a channel between the first electronic device 120 and the second electronic device 130, and then determine transmission-or-not or transmission power using the predicted channel quality.

Although an example where the channel quality of the channel between the first electronic device 120 and the second electronic device 130 is predicted has been described in various embodiments of the present disclosure, the example may be applied to a channel between a base state and the first electronic device 120 or the second electronic device 130.

In addition, although a case where the first electronic device 120 is located in a right hand of a user and the second electronic device 130 is attached to a left wrist of the user has been described in the scenario of FIG. 1, the first electronic device 120 may be located at a hip of the user and the second electronic device 130 may be attached to an ankle, a thigh, a forearm, etc. of the user.

In an embodiment of the present disclosure, the first electronic device 120 may exist within a constant distance from a user (for example, exists in a bag which the user wears), and the second electronic device 130 may be in contact with the body of the user.

Figure 2:
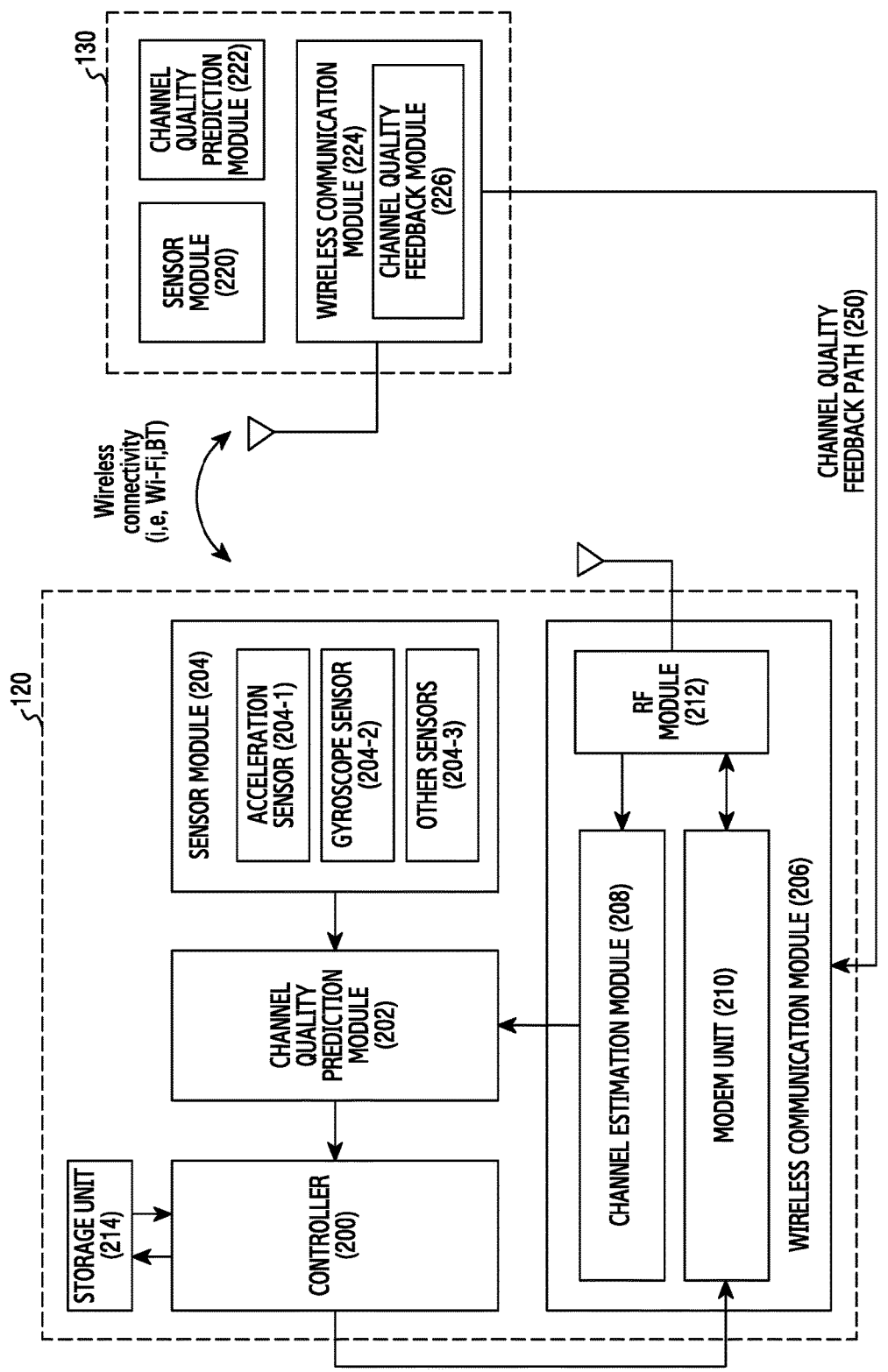
FIG. 2 is a block diagram of two electronic devices of FIG. 1 according to an embodiment of the present disclosure.

FIG. 2 is a block diagram of two electronic devices of FIG. 1 according to an embodiment of the present disclosure.

Referring to FIG. 2, the first electronic device 120 includes a controller 200, a channel quality prediction module 202, a sensor module 204, a wireless communication module 206, and a storage unit 214. The second electronic device 130 includes a sensor module 220, a channel quality prediction module 222, and a wireless communication module 224. In this case, the channel quality prediction module 202 and the channel quality prediction module 222 may perform the same function, the sensor module 204 and the sensor module 220 may perform the same function, and the wireless communication module 206 and the wireless communication module 224 may perform the same function.

The sensor module 204 may include an acceleration sensor 204-1, a gyroscope sensor 204-2, and other sensors 204-3.

The wireless communication module 206 may include a channel estimation module 208, a MOdulator/DEModulator (MODEM) unit 210, and a Radio Frequency (RF) module 212.

The controller 200 controls a plurality of hardware or software components connected to the controller 200 by driving an operating system or an application program and can process and calculate various pieces of data. The controller 200 may be implemented as, for example, a System on Chip (SoC).

The channel estimation module 208 performs channel estimation. For example, the channel estimation module 208 measures an intensity of a signal transmitted by the second electronic device 130 or measures a Signal-to-Noise Ratio (SNR) or a Signal to Interference plus Noise Ratio (SINR) for a channel between the second electronic device 130 and the first electronic device 120 so as to provide the measured result to the channel quality prediction module 202.

The channel quality prediction module 202 receives a detection signal from the sensor module 204 and determines movement of the user to which the first electronic device 120 is attached. For example the channel quality prediction module 202 determines whether a user runs, walks, stops on the basis of a periodic pattern of the detection signal of the sensor module 204.

The channel quality prediction module 202 uses a signal pattern pre-stored in the storage unit 214 under a control of the controller 200. That is, the storage unit 214 pre-stores signal patterns corresponding to the movement of the user, and when one of a plurality of types of user movement is selected by the user, a signal pattern corresponding to the selected user movement can be received from the storage unit 214.

Further, the channel quality prediction module 202 predicts channel quality between the second electronic device 130 and the first electronic device 120 on the basis of the channel estimation result of the channel estimation module 208 and the determined movement of the user 110.

The controller 200 determines a data transmission interval (or transmission-or-not) or electrical transmission power according to the channel quality predicted by the channel quality prediction module 202. For example, the controller 200 can, when the channel quality is greater than a threshold value, transmit a transmission decision to the wireless communication module 206 to start data transmission, and when the channel quality is less than a threshold value, wait for (or hold) the transmission, thereby perform efficient data transmission. Further, only a required amount of electrical transmission power is used in consideration of the predicted channel quality in addition to data transmission time point control, making it possible to efficiently manage electrical power.

The MODEM unit 210 performs data transmission/reception in communication between other electronic devices (e.g., the second electronic device 130) connected to the first electronic device 120 through a network. According to an embodiment of the present disclosure, the wireless communication module 206 may include a cellular module, a Wi-Fi module, a BT module, a GPS module, and Near Field Communication (NFC) module.

The cellular module may provide a voice call, a video call, a Short Message Service (SMS), an Internet service, etc. through a communication network (for example, LTE, LTE-A, CDMA, WCDMA, UMTS, Wireless Broadband (WiBro), Global System for Mobile communications (GSM), etc.). Further, the cellular module can perform distinguishment and authentication of an electronic device within a communication network using, for example, a Subscriber Identification Module (SIM). According to an embodiment of the present disclosure, the cellular module may perform at least some of the functions provided by the controller 200. For example, the cellular module may perform at least a part of the multimedia control functions.

According to an embodiment of the present disclosure, the cellular module may include a Communication Processor (CP). Further, the cellular module may be implemented by, for example, an SoC.

According to an embodiment of the present disclosure, the controller 200 or the cellular module (for example, a CP) may load, to a volatile memory, a command or data received from at least one of a non-volatile memory and other components connected to each of the controller 200 and the cellular module, and process the loaded command or data. Further, the controller 200 or the cellular module may store data received from or generated by at least one of other elements, in a non-volatile memory.

Each of the Wi-Fi module, the BT module, the GPS module, and the NFC module may include, for example, a processor for processing data transmitted/received through the corresponding module. Each of the cellular module, the Wi-Fi module, the BT module, the GPS module, or the NFC module may be configured by a separate block. According to an embodiment of the present disclosure, at least a part (e.g., two or more) of the cellular module, the Wi-Fi module, the BT module, the GPS module, or the NFC module may be included in one Integrated Circuit (IC) or in an IC package. For example, at least a part (e.g., the communication processor corresponding to the cellular module and the Wi-Fi processor corresponding to the Wi-Fi module) of the processors corresponding to the cellular module, the Wi-Fi module, the BT module, the GPS module, and the NFC module may be implemented as one SoC.

The RF module 212 transmits/receives data, for example, an RF signal. The RF module 212 may, for example, include a transceiver, a Power Amplifier Module (PAM), a frequency filter, a Low Noise Amplifier (LNA), or the like. Further, the RF module 212 may further include a component for transmitting/receiving an electromagnetic wave in the air in radio communication, such as a conductor or a conductive wire. Although it has been described above that the cellular module, the Wi-Fi module, the BT module, the GPS module, and the NFC module share one RF module 211, according to an embodiment of the present disclosure, at least one of the cellular module, the Wi-Fi module, the BT module, the GPS module, and the NFC module may transmit/receive an RF signal through a separate RF module.

The storage unit 214 may include an internal memory or an external memory. The internal memory may include, for example, at least one of a volatile memory (e.g., a Dynamic Random Access Memory (DRAM), a Static RAM (SRAM), and a Synchronous Dynamic RAM (SDRAM)), and a non-volatile Memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory).

According to an embodiment of the present disclosure, the internal memory may be a Solid State Drive (SSD). The external memory may further include a flash drive, for example, a Compact Flash (CF) drive, a Secure Digital (SD) memory card, a Micro Secure Digital (Micro-SD) memory card, a Mini Secure Digital (Mini-SD) memory card, an extreme Digital (xD) memory card, or a memory stick. The external memory may be functionally connected to the first electronic device 120 through various interfaces. According to an embodiment of the present disclosure, the first electronic device may further include a storage device (or a storage medium) such as a hard disk drive.

According to an embodiment of the present disclosure, the storage unit 214 may store detection signals of a sensor corresponding to the movement of a user or periodic pattern information of the detection signals of the sensor. For example, the storage unit 214 can store detection signal pattern information of a sensor corresponding to the case where a user jogs while gripping the first electronic device 120 by a right hand thereof and store detection signal pattern information of the sensor corresponding to the case where the user jogs while the second electronic device 130 is attached to the user's left wrist.

The sensor module 204 measures a physical quantity or detects an operating state of the first electronic device 120 to convert the measured or detected information into an electrical signal. The sensor module 204 may include, for example, an acceleration sensor 204-1 for measuring acceleration, a gyroscope sensor 204-2 for measuring rotation, and other sensors 204-3. The other sensors 204-3 may include at least one of a gesture sensor, an air pressure sensor, a magnetic sensor, a grip sensor, a proximity sensor, a color sensor (e.g., a Red Green Blue (RGB) sensor), a biometric sensor, a temperature/humidity sensor, an illuminance sensor, and an UltraViolet (UV) light sensor. Additionally or alternatively, the sensor module 204 may include, for example, an Electronic nose (E-nose) sensor, an ElectroMyoGraphy (EMG) sensor, an ElectroEncephalogram (EEG) sensor, an ElectroCardioGram (ECG) sensor, an InfraRed (IR) sensor, an iris sensor, a fingerprint sensor, or the like. The sensor module 204 may further include a control circuit for controlling at least one sensor included therein.

In an embodiment of the present disclosure, the channel quality prediction module 222 of the second electronic device 130 can predict an intensity of a wireless channel between the first electronic device 120 and the second electronic device 130 using movement information of a user measured by the sensor module 220 and channel intensity information measured by the wireless communication module 224. Further, the second electronic device 130 can determine a data transmission interval (transmission-or-not) and electrical transmission power on the basis of the predicted channel quality.

In an embodiment of the present disclosure, although the first electronic device 120 may measure the intensity of a wireless channel between the first electronic device 120 and the second electronic device 130, when a wireless communication system being used is a Frequency Division Duplex system, i.e., when a system uses a different frequency for transmission and reception, the channel quality cannot be determined using a reception signal, and thus, a separate feedback is required. In this case, the wireless communication module 224 of an electronic device for performing reception, e.g., the second electronic device 130, may further include a channel quality feedback module 226 for feeding back channel quality information to the first electronic device 120 through a channel quality feedback path 250.

The above described components of the electronic device according to various embodiments of the present disclosure may be formed of one or more components, and a name of a corresponding component element may be changed based on the type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
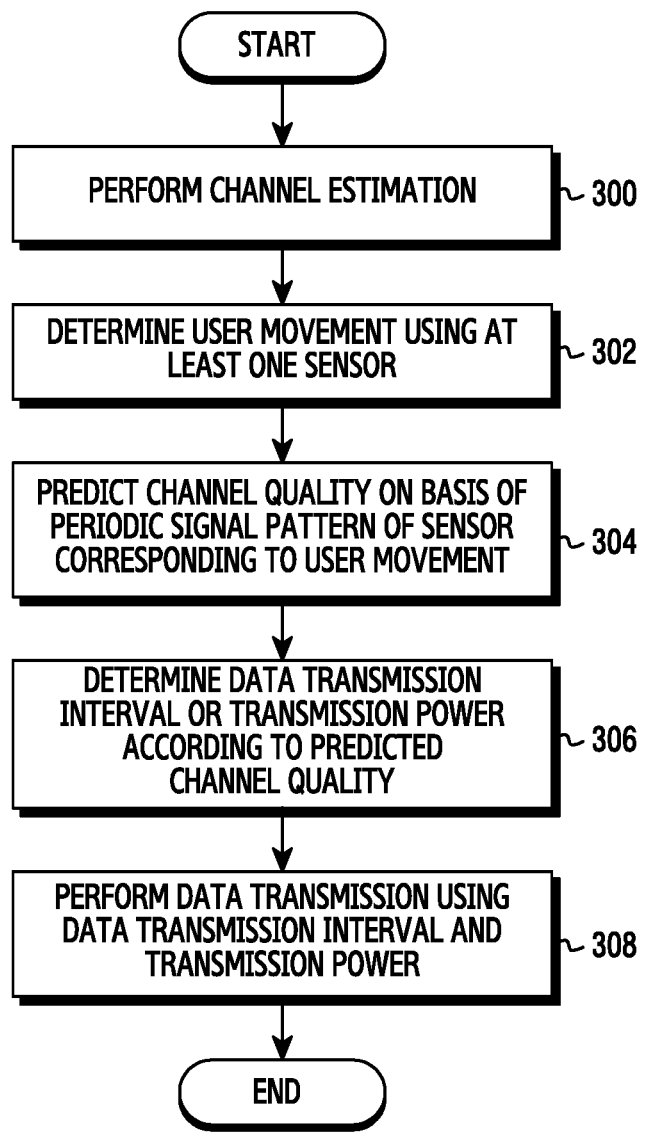
FIG. 3 is a flowchart of a method of performing data transmission/reception through predicting channel quality for a wireless channel between two electronic devices which are attached to the body of a user and communicate with each other according to an embodiment of the present disclosure.

FIG. 3 is a flowchart of a method of performing data transmission/reception through predicting channel quality for a wireless channel between two electronic devices which are attached to the body of a user and communicate with each other according to various embodiments of the present disclosure.

Referring to FIG. 3, in step 300, the second electronic device 130 performs channel estimation. For example, the second electronic device 130 measures an intensity of a signal transmitted by the first electronic device 120 or measures an SNR or an SINR for a channel between the second electronic device 130 and the first electronic device 120.

In step 302, the second electronic device 130 measures movement of the user 110 to which the second electronic device 130 is attached, using at least one sensor. For example, the second electronic device 130 can determine whether a user runs, walks, or stops on the basis of a periodic pattern of a signal detected through the at least one sensor.

In an embodiment of the present disclosure, when not including or not being able to use a sensor module 220 for detecting the movement of the user 110, the second electronic device 130 determines the movement of the user 110 using a sensor module of the first electronic device 120. For example, the first electronic device 120 provides a detection signal of a sensor corresponding to the movement of the user 110 to the second electronic device 130 through the P2P communication 140 or the Internet 100.

In an embodiment of the present disclosure, when the first electronic device 120 and the second electronic device 130 do not include or use a sensor module for detecting the movement of the user 110, signal pattern information pre-stored in the storage unit 214 inside the first electronic device 120 or the second electronic device 130 is used. That is, the storage unit 214 pre-stores signal patterns corresponding to the movement of the user, and when one of a plurality of types of user movement is selected by the user, a signal pattern corresponding to the selected user movement is used.

In step 304, the second electronic device 130 predicts channel quality between the first electronic device 120 and the second electronic device 130 on the basis of the result obtained by the channel estimation in step 300 and the movement of the user 110 determined in step 302.

Figure 7:
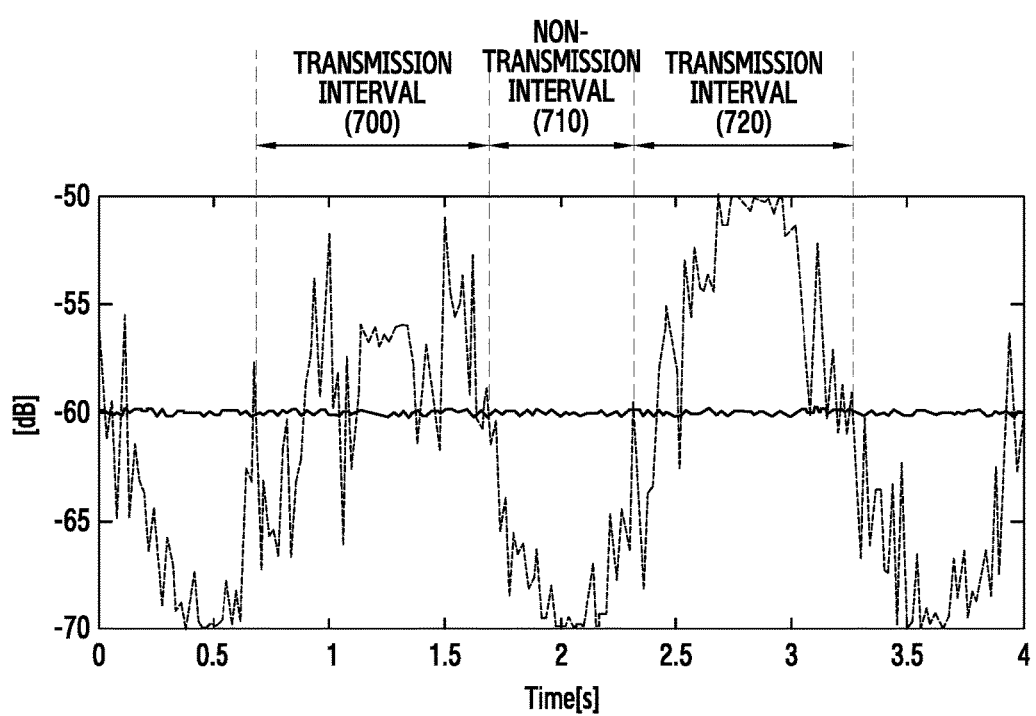
FIG. 7 is a graph depicting a change in a signal intensity of a wireless channel between two electronic devices which are attached to the body of a user and communicate with each other according to an embodiment of the present disclosure.

For example, as illustrated in FIG. 7, the second electronic device 130 can identify that a signal intensity for a wireless channel between the first electronic device 120 and the second electronic device 130 changes according to a periodic pattern received which is influenced by repeated operations of the user 110.

Figure 8:
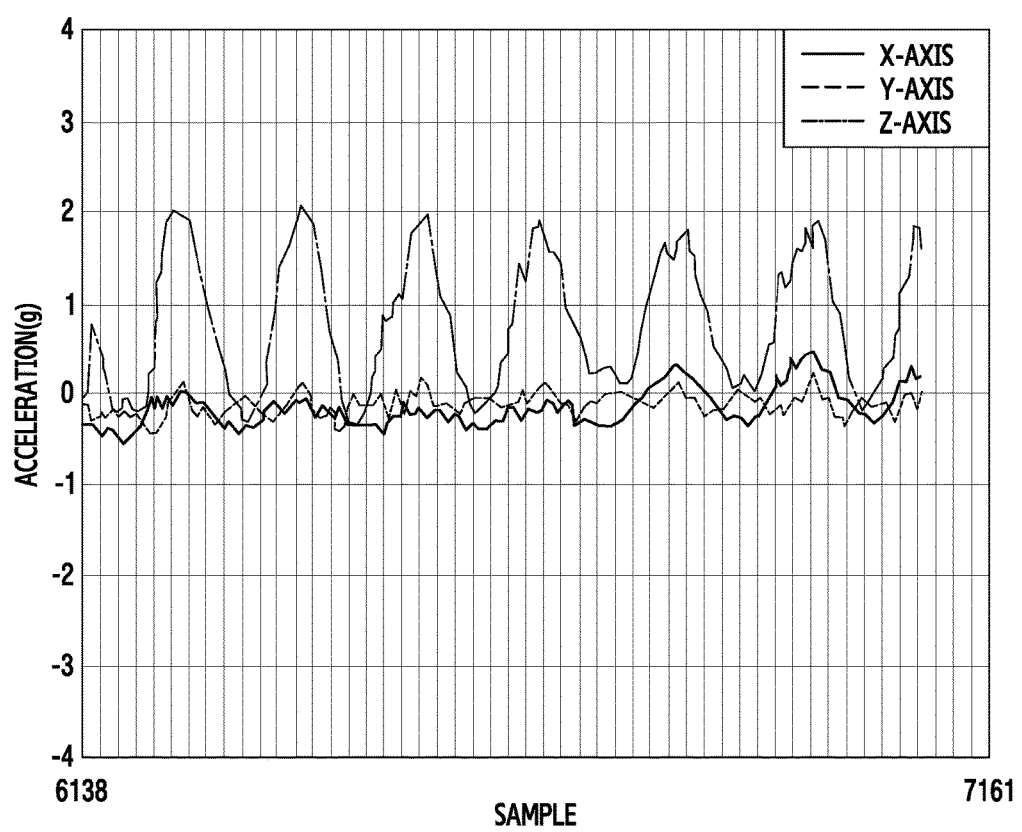
FIG. 8 is a graph depicting a change in an acceleration value of x, y, and z axes of a gyroscope according to a user movement according to an embodiment of the present disclosure.

Further, as illustrated in FIG. 8, z-axial acceleration in detection signals of an accelerometer changes in a periodic pattern according to the movement of the user 110.

Therefore, the second electronic device 130 can synchronize the periodic pattern of the detection signal of the sensor with a change in the channel quality for a wireless channel between the first electronic device 120 and the second electronic device 130. For example, as illustrated in FIGS. 7 and 8, when the detection signal of the sensor and the channel quality have the same characteristics (e.g., the same period, the same sine waveform, and the like) and the second electronic device 130 knows these characteristics, even when the channel is not estimated for a long time, it can be predicted that the channel changes as illustrated in FIG. 7 through consistent movement estimation as illustrated in FIG. 8 instead of the channel estimation. Then, in a signal intensity change graph synchronized with a periodic pattern of the detection signal of the sensor, it can be predicted that signal intensities of an interval 700 of 0.6 seconds to 1.7 seconds and an interval 720 of 2.4 seconds to 3.3 seconds are greater than a threshold value, and an signal intensity of an interval 710 of 1.7 seconds to 2.4 seconds is lower than a threshold value.

In an embodiment of the present disclosure, the second electronic device 130 can predict the channel quality for a wireless channel between the first electronic device 120 and the second electronic device 130 in consideration of user movement in which the second electronic device 130 moves toward the first electronic device 120 instead of the periodic signal pattern of the sensor. For example, the second electronic device 130 recognizes that the first electronic device 120 is located at a right hand of the user, and can predict that the channel quality of a wireless channel between the first electronic device 120 and the second electronic device 130 improves over the current channel quality when it is detected that the second electronic device 130 moves towards the first electronic device 120 or the first electronic device 120 moves towards the second electronic device 130. In contrast, the second electronic device 130 recognizes that the first electronic device 120 is located at a right hand of the user, and can predict that the channel quality of a wireless channel between the first electronic device 120 and the second electronic device 130 deteriorates over the current channel quality when it is detected that the second electronic device 130 moves away from the first electronic device 120 or the first electronic device 120 moves away from the second electronic device 130.

In step 306, the second electronic device 130 determines a data transmission interval (or transmission-or-not) or transmission power according to the predicted channel quality.

For example, as illustrated in FIG. 7, the second electronic device 130 can determine intervals 700, 720, the predicted channel quality of which is greater than a threshold value, as a transmission interval, and can determine an interval 710, the predicted channel quality of which is less than a threshold value, as non-transmission interval (i.e., a standby interval).

In an embodiment of the present disclosure, the second electronic device 130 allocates low electrical transmission power when the predicted channel quality (e.g., the signal intensity) is greater than a threshold value, and allocates high electrical transmission power when the predicted channel quality (e.g., the signal intensity) is less than the threshold value.

In step 308, the second electronic device 130 transmits the corresponding data to the first electronic device 120 using the determined transmission interval or the determined electrical transmission power.

In another embodiment of the present disclosure, the first electronic device 120 may predict the channel quality for a wireless channel between the first electronic device 120 and the second electronic device 130 in consideration of user movement. The first electronic device 120 may allocate a resource to the second electronic device 130 based on the predicted channel quality. Thus, the second electronic device 130 may transmits data or control signal to the first electronic device 120 using the allocated resource.

Figure 4:
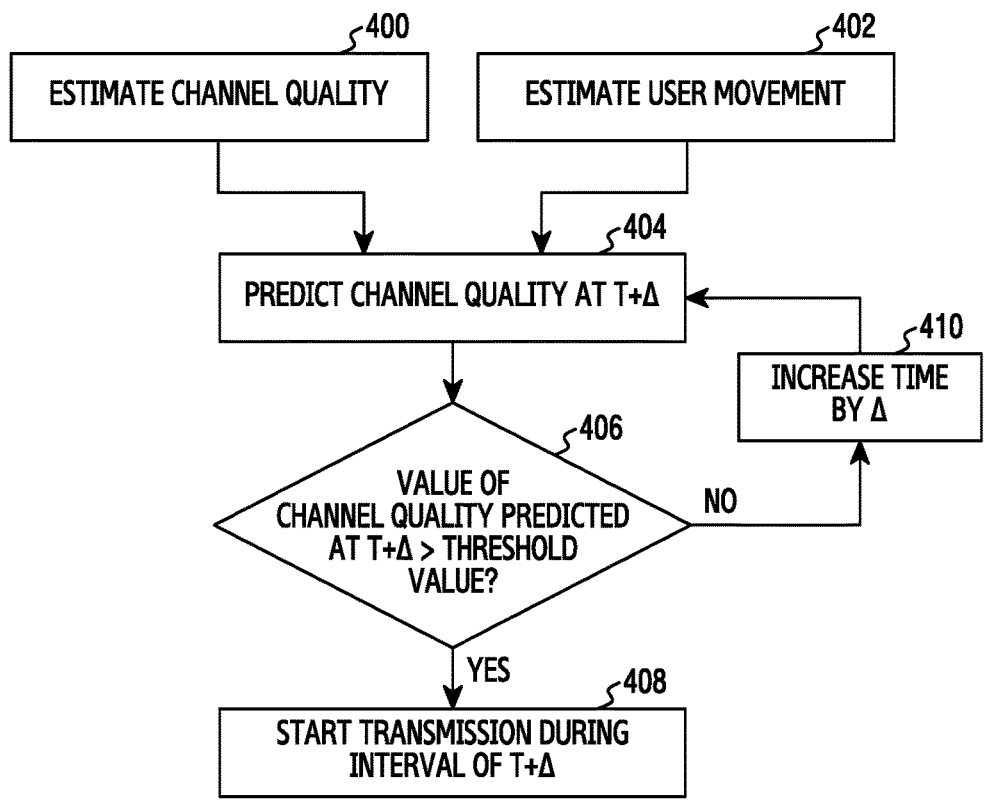
FIG. 4 is a flowchart of a method of performing data transmission/reception through predicting channel quality for a wireless channel between two electronic devices which are attached to the body of a user and communicate with each other according to an embodiment of the present disclosure.

FIG. 4 is a flowchart of a method for performing data transmission/reception through predicting channel quality for a wireless channel between two electronic devices which are attached to the body of a user and communicate with each other according to an embodiment of the present disclosure.

Referring to FIG. 4, the second electronic device 130 performs channel estimation, in step 400, which is identical to step 300 in FIG. 3.

The second electronic device 130 determines movement of the user 110 to which the second electronic device 130 is attached using at least one sensor, in step 402, which is identical to step 302 in FIG. 3.

In an embodiment of the present disclosure, when not including or not being able to use a sensor module 220 for detecting the movement of the user 110, the second electronic device 130 determines the movement of the user 110 using a sensor module 204 of the first electronic device 120. For example, the first electronic device 120 can provide a detection signal of a sensor corresponding to the movement of the user 110 to the second electronic device 130 through the P2P communication 140 or the Internet 100.

In an embodiment of the present disclosure, when the first electronic device 120 and the second electronic device 130 do not include or use a sensor module 204, 220 for detecting the movement of the user 110, signal pattern information pre-stored in the storage unit 214 inside the first electronic device 120 or the second electronic device 130 may be used. That is, the storage unit 214 pre-stores signal patterns corresponding to the movement of the user, and when one of a plurality of types of user movement is selected by the user, a signal pattern corresponding to the selected user movement can be used.

In step 404, the second electronic device 130 predicts channel quality between the first electronic device 120 and the second electronic device 130 after δ seconds from the current time T on the basis of the result obtained by the channel estimation in step 400 and the movement of the user 110 determined in step 402.

In step 406, when a value of the predicted channel quality after δ seconds is greater than a threshold value, the second electronic device 130 proceeds to step 408 to start transmission after δ seconds.

That is, the second electronic device 130 predicts an upcoming channel intensity on the basis of the measured intensity of the channel and the measured movement of the user, and starts transmission of data when the intensity of the channel is greater than a peak value or an average value thereof is greater than a threshold value.

In step 406, when a value of the predicted channel quality after δ seconds is less than a threshold value in step 406, the second electronic device 130 proceeds to step 410 to increase δ and proceeds to step 404.

Figure 5:
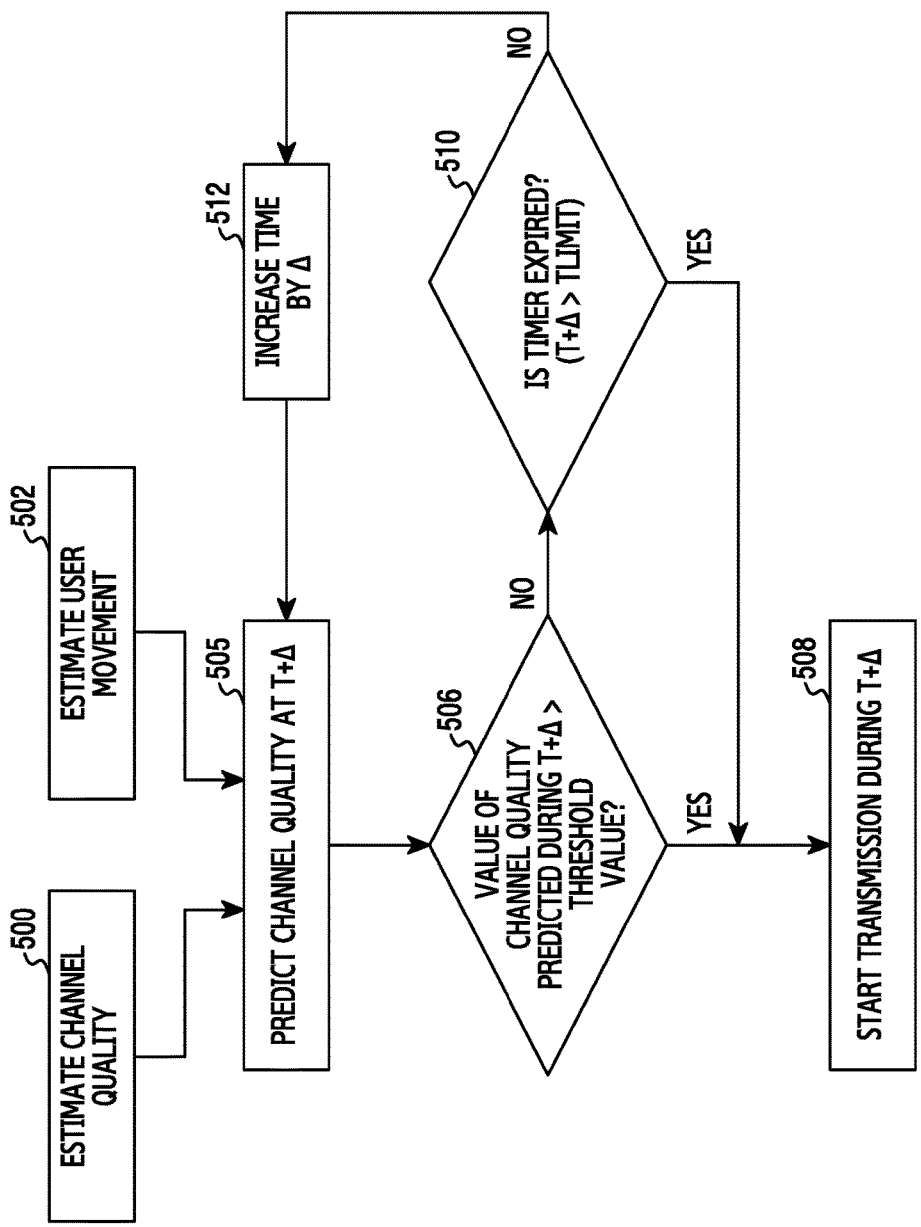
FIG. 5 is a flowchart of a method of performing data transmission/reception through predicting channel quality for a wireless channel between two electronic devices which are attached to the body of a user and communicate with each other according to an embodiment of the present disclosure.

FIG. 5 is a flowchart of a method of performing data transmission/reception through predicting channel quality for a wireless channel between two electronic devices which are attached to the body of a user and communicate with each other according to an embodiment of the present disclosure.

Referring to FIG. 5, the second electronic device 130 performs channel estimation, in step 500, which is identical to step 300 in FIG. 3.

The second electronic device 130 estimates movement of the user 110 to which the second electronic device 130 is attached using at least one sensor, in step 502, which is identical to step 302 in FIG. 3.

In an embodiment of the present disclosure, when not including or not being able to use a sensor module 220 for detecting the movement of the user 110, the second electronic device 130 determines the movement of the user 110 using a sensor module 204 of the first electronic device 120. For example, the first electronic device 120 can provide a detection signal of a sensor corresponding to the movement of the user 110 to the second electronic device 130 through the P2P communication 140 or the Internet 100.

In an embodiment of the present disclosure, when the first electronic device 120 and the second electronic device 130 do not include or use a sensor module 204, 220 for detecting the movement of the user 110, signal pattern information pre-stored in the storage unit 214 inside the first electronic device 120 or the second electronic device 130 may be used. That is, the storage unit 214 pre-stores signal patterns corresponding to the movement of the user, and when one of a plurality of types of user movement is selected by the user, a signal pattern corresponding to the selected user movement can be used.

In step 505, the second electronic device 130 predicts channel quality between the first electronic device 120 and the second electronic device 130 for an interval of T+δ on the basis of the result obtained by the channel estimation in step 500 and the movement of the user 110 determined in step 502.

In step 506, when a value of the predicted channel quality after δ seconds is greater than a threshold value, the second electronic device 130 proceeds to step 508 to start transmission after δ seconds.

That is, the second electronic device 130 predicts an upcoming channel intensity on the basis of the measured intensity of a channel and the measured movement of the user, and starts transmission of data when the intensity of the channel is greater than a peak value or an average value thereof is greater than a threshold value.

When the value of the predicted channel quality after δ seconds is less than the threshold value in step 506, the second electronic device 130 proceeds to step 510 to determine whether a timer is expired, proceeds to step 508 when the timer is expired, and proceeds to step 512 when the timer is not expired. The second electronic device 130 increases a time by δ seconds in step 512, and proceeds to step 505.

When a change in a channel according to the passing of time is small, the channel quality cannot satisfy a transmission condition within a short time period, and transmission cannot be started. Therefore, the timer is used, so that the second electronic device 130 can start the transmission even when the channel quality does not satisfy the transmission condition and the transmission is not performed for a predetermined time period ($T_{limit}$).

Meanwhile, the transmission time point is determined through predicting the channel quality, and the electrical transmission power can be additionally controlled using the movement information of the user.

Figure 6:
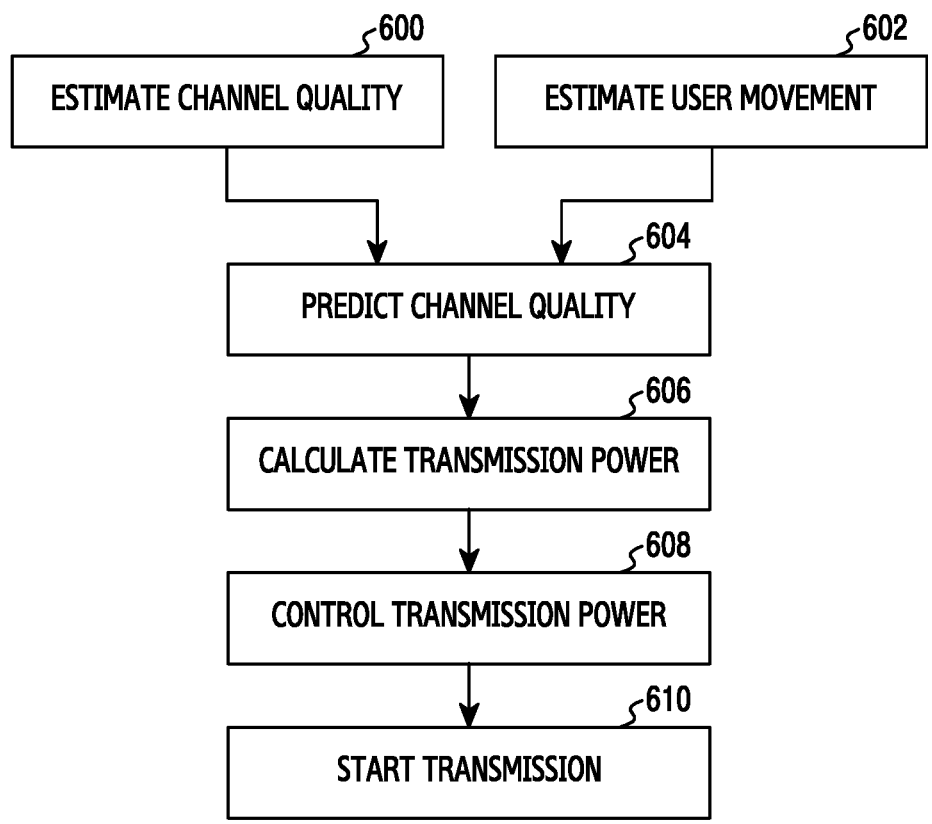
FIG. 6 is a flowchart of a method of performing data transmission/reception through predicting channel quality for a wireless channel between two electronic devices which are attached to the body of a user and communicate with each other according to an embodiment of the present disclosure.

FIG. 6 is a flowchart of a method of controlling electrical power using a predicted intensity of a channel.

FIG. 6 illustrates a method of performing data transmission/reception through predicting channel quality for a wireless channel between two electronic devices which are attached to the body of a user and communicate with each other according to an embodiment of the present disclosure.

Referring to FIG. 6, the second electronic device 130 performs channel estimation, in step 600, which is identical to step 300 in FIG. 3.

The second electronic device 130 measures movement of the user 110 to which the second electronic device 130 is attached using at least one sensor, in step 602, which is identical to step 302 in FIG. 3.

In an embodiment of the present disclosure, when not including or not being able to use a sensor module 220 for detecting the movement of the user 110, the second electronic device 130 determines the movement of the user 110 using a sensor module of the first electronic device 120. For example, the first electronic device 120 can provide a detection signal of a sensor corresponding to the movement of the user 110 to the second electronic device 130 through the P2P communication 140 or the Internet 100.

In an embodiment of the present disclosure, when the first electronic device 120 and the second electronic device 130 do not include or use a sensor module 204, 220 for detecting the movement of the user 110, signal pattern information pre-stored in the storage unit 214 inside the first electronic device 120 or the second electronic device 130 may be used. That is, the storage unit 214 pre-stores signal patterns corresponding to the movement of the user, and when one of a plurality of types of user movement is selected by the user, a signal pattern corresponding to the selected user movement is used.

In step 604, the second electronic device 130 predicts channel quality between the first electronic device 120 and the second electronic device 130 on the basis of the result obtained by the channel estimation in step 600 and the movement of the user 110 determined in step 602.

In step 606, the second electronic device 130 calculates transmission power on the basis of the predicted channel quality.

In step 608, the second electronic device 130 controls transmission power on the basis of the calculated transmission power.

In step 610, the second electronic device 130 transmits data on the basis of the controlled transmission power.

In an embodiment of the present disclosure, the transmission power control (FIG. 6) and the transmission time point determination (FIGS. 4 and 5) can be performed independently or simultaneously.

While the case where the second electronic device 130 predicts the channel quality for a wireless channel between the first electronic device 120 and the second electronic device 130 is described above in FIGS. 3 to 6, the first electronic device 120 can predict the channel quality for a wireless channel between the first electronic device 120 and the second electronic device 130 in an embodiment of the present disclosure in the same manner.

FIG. 7 is a graph depicting a change in a signal intensity of a wireless channel between two electronic devices which are attached to the body of a user and communicate with each other according to an embodiment of the present disclosure.

FIG. 7 depicting an approximate change in a signal intensity for a wireless channel between the first electronic device 120 and the second electronic device 130 when a user walks or runs in an environment in which the first electronic device 120 is attached to a hip of the user and the second electronic device 130 is worn on a wrist.

For example, a signal intensity for a wireless channel between the first electronic device 120 and the second electronic device 130 when the user walks or runs has a periodic pattern and changes. In other words, it can be seen that the signal intensity for a wireless channel between the first electronic device 120 and the second electronic device 130 changes in a periodic pattern due to the influence of repeated operations of a user.

FIG. 8 is a graph depicting a change in an acceleration value of x, y, and z axes of an accelerometer according to a user movement according to an embodiment of the present disclosure.

Referring to FIG. 8, acceleration values of x, y, and z axes which are detected by an accelerometer of an electronic device attached to the body of a user are illustrated. The accelerometer expresses the movement of the electronic device in x, y, and z axes. In FIG. 8, the z-axis denotes a gravitational direction, i.e., an up-down directional movement, the x-axis denotes a front-rear directional movement, and the y-axis denotes the left-right directional movement. For example, when a user wears an electronic device on the body (e.g., a wrist) and moves (e.g., walks or runs), an acceleration value of the z-axis changes in a periodic pattern according to the up-down movement of the body or an arm, and acceleration values of the x-axis and the y-axis slightly change, but changes in the acceleration values of the x-axis and the y-axis are less than a change in the acceleration value of the z-axis.

The change in the signal intensity for a wireless channel between the first electronic device 120 and the second electronic device 130 in FIG. 7 and the change in the detection signal of the accelerometer in FIG. 8 have similar patterns.

Figure 9:
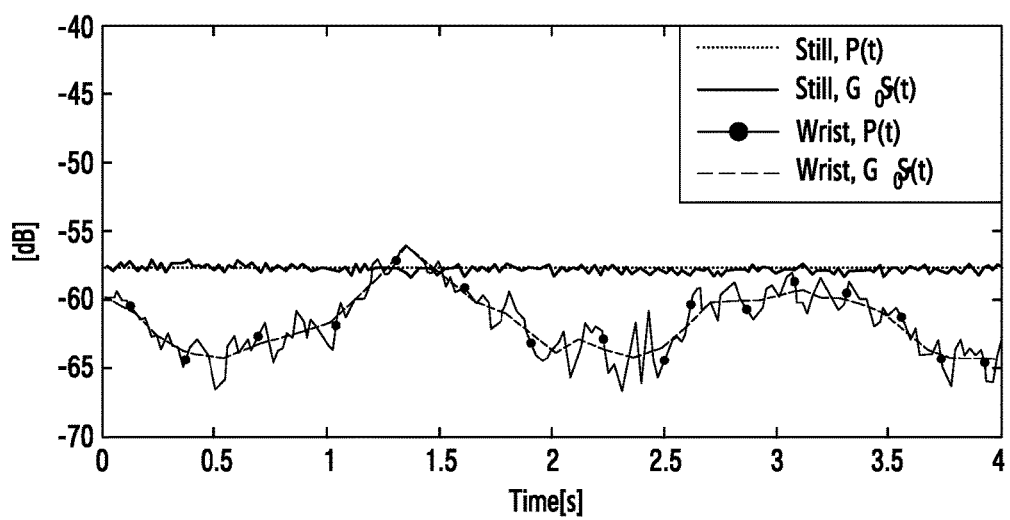
FIG. 9 is a graph depicting a change in a signal intensity of a wireless channel between two electronic devices when a first electronic device is attached to a hip of a user and a second electronic device is attached to a wrist of the user according to an embodiment of the present disclosure.

FIG. 9 is a graph depicting a change in a signal intensity of a wireless channel between two electronic devices when a first electronic device 120 is attached to a hip of a user and a second electronic device 130 is attached to a wrist of the user according to an embodiment of the present disclosure.

Referring to FIG. 9, in the first electronic device 120 and the second electronic device 130, a change in a signal intensity of a wireless channel between the two electronic devices is illustrated to be very small when there is no user movement (thick line), when wireless channel fading is considered (solid thick line), and when the wireless channel fading is not considered (dotted line).

In the first electronic device 120 and the second electronic device 130, the change in the signal intensity of the wireless channel between the two electronic devices is illustrated to greatly increase or decrease in a periodic pattern when there is user movement (thin lines), when the wireless channel fading is considered (solid thin line), and when the wireless channel fading is not considered (dashed thin line).

Figure 10:
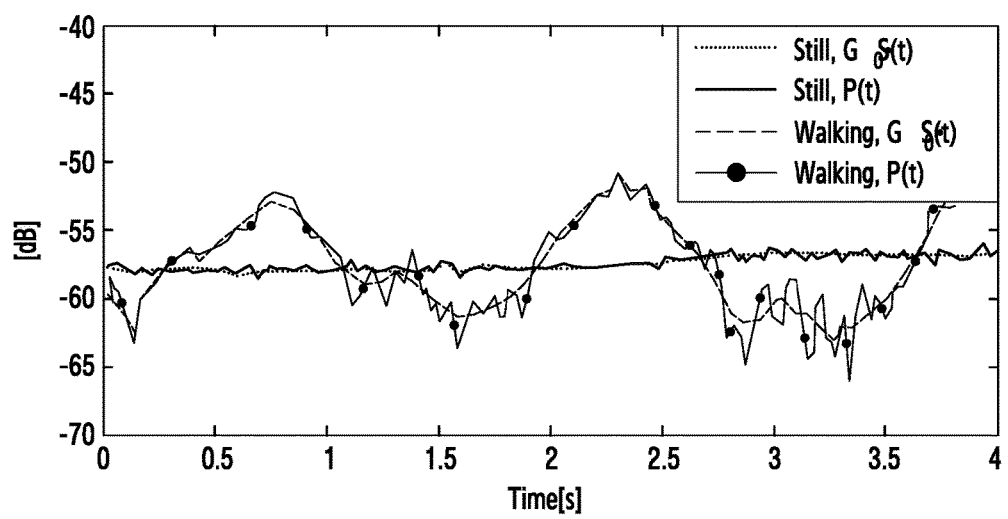
FIG. 10 is a graph depicting a change in a signal intensity of a wireless channel between two electronic devices when a first electronic device is attached to a hip of a user and a second electronic device is attached to a thigh of the user according to an embodiment of the present disclosure.

FIG. 10 is a graph depicting a change in a signal intensity of a wireless channel between two electronic devices when a first electronic device 120 is attached to a hip of a user and a second electronic device 130 is attached to a thigh of the user according to an embodiment of the present disclosure.

Referring to FIG. 10, in the first electronic device 120 and the second electronic device 130, a change in a signal intensity of a wireless channel between the two electronic devices is illustrated to be very small when there is no user movement (thick line), when wireless channel fading is considered (solid thick line), and when the wireless channel fading is not considered (dotted line).

In the first electronic device 120 and the second electronic device 130, the change in the signal intensity of the wireless channel between the two electronic devices is illustrated to be large in a periodic pattern when there is user movement (thin lines), when the wireless channel fading is considered (solid thin line), and when the wireless channel fading is not considered (dashed thin line). For example, in the first electronic device 120 and the second electronic device 130, a pattern which increases or decreases on the basis of a signal intensity of a wireless channel between the two electronic device when there is no user movement (thick line) is repeatedly illustrated.

In accordance with various embodiments of the present disclosure, a first chip set is provided. The first chip set includes a sensor module configured to detect motion of the first chip set, a channel quality prediction module configured to predict the wireless channel quality between the first chip set and a second chip set using the detected motion and a wireless communication module configured to allocate a resource for transmitting data to the second chip set on the basis of the predicted channel quality.

The wireless communication module is further configured to determine an interval in which the predicted wireless channel quality is greater than or equal to a threshold value as a transmission interval and determine an interval in which the predicted wireless channel quality is less than the threshold value as a non-transmission interval.

The wireless channel quality is an intensity of a reception signal from the second chip set.

The wireless communication module is further configured to transmit data at a corresponding time point of the non-transmission interval when the non-transmission interval is greater than a predetermined time period.

The wireless communication module is further configured to control electrical transmission power for transmitting the data on the basis of the predicted channel quality.

The channel quality prediction module is further configured to synchronize a change in the wireless channel quality between the first chip set and the second chip set with the detected motion, and predict the wireless channel quality between the first chip set and the second chip set on the basis of the change in the wireless channel quality synchronized with the detected motion.

The wireless communication module comprises a channel estimation module configured to estimate the wireless channel quality between the first chip set and the second chip set.

The wireless communication module is further configured to compensate for the estimated wireless channel quality using the predicted wireless channel quality.

The wireless communication module is further configured to transmit a reference signal to the second chip set, and feedback channel quality information corresponding to the reference signal from the second chip set, wherein the channel quality information is used for predicting the wireless channel quality between the first chip set and the second chip set.

The first chip set is further comprised to be in contact with a body of a user, and the second chip set is comprised to be located within a predetermined distance from the first chip set.

In accordance with various embodiments of the present disclosure, a method of operating a first terminal is provided the method includes detecting motion of the first terminal by a sensor, predicting a channel quality between the first terminal and a second terminal using the detected motion and receiving data to the second terminal on the basis of the predicted channel quality.

The term "module" used in various embodiments of the present disclosure may refer to, for example, a "unit" including one of hardware, software, and firmware, or a combination of two or more of the hardware, software, and firmware. The term "module" may be interchangeably used with a term, such as "unit," "logic," "logical block," "component," or "circuit." The term "module" may refer to the smallest unit of an integrated component or a part thereof. The term "module" may refer to the smallest unit that performs one or more functions or a part thereof. The term "module" may refer to a component that is mechanically or electronically implemented. For example, the term "module" according to various embodiments of the present disclosure may include at least one of an Application-Specific Integrated Circuit (ASIC), a Field-Programmable Gate Array (FPGA), and a programmable-logic device for performing operations which are known or will be developed.

According to an embodiment of the present disclosure, at least a part of a device (for example, modules or functions thereof) or a method (for example, steps) according to the embodiment of the present disclosure may be embodied by, for example, a command stored in a non-transitory computer-readable recording medium in a form of a programming module. When the command is executed by one or more processors (for example, the controller 200), the one or more processors may execute a function corresponding to the command. The non-transitory computer-readable recording medium may be, for example, the storage unit 214. At least some of the programming modules may be implemented (for example, executed) by, for example, the processor. At least some of the programming modules may include, for example, a module, a program, a routine, a set of instructions or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices configured to store and execute program commands, such as a Read Only Memory (ROM), a Random Access Memory (RAM), and a flash memory. In addition, the program instructions may include high level language code, which can be executed in a computer by using an interpreter, as well as machine code generated by a compiler. The aforementioned hardware device may be configured to operate as one or more software modules in order to perform the operation of various embodiments of the present disclosure, and vice versa.

A programming module according to the present disclosure may include at least one of the described components, a few of the components may be omitted, or additional components may be included. Operations executed by a module, a programming module, or other components according to various embodiments of the present disclosure may be executed sequentially, in parallel, repeatedly, or in a heuristic manner. Furthermore, some operations may be executed in a different order or may be omitted, or other operations may be added.

According to an embodiment of the present description, a storage medium stores commands, and the commands are configured to allow at least one processor to perform at least one operation when being executed by the at least one processor. The at least one operation includes detecting a signal pattern according to motion of the first electronic device 120 by a sensor included in the first electronic device 120, wherein the signal pattern corresponds to a pattern of wireless channel quality between the first electronic device 120 and a second electronic device 130; predicting the wireless channel quality between the first electronic device 120 and the second electronic device 130 using the signal pattern detected by the sensor; and allocating a resource for transmitting data to the second electronic device 130 on the basis of the predicted channel quality.

As described above, the channel quality between two electronic devices are predicted using the detection signal pattern of the sensor module 204, 220 corresponding to the user movement, thereby reducing data transmission/reception failure of the electronic devices.

Further, electrical power waste caused by transmission/reception failure of electronic devices can be reduced.

In addition, transmission/reception is performed with the same electrical transmission power in an interval in which the channel quality is high, thereby obtaining a high transmission rate.

The embodiments of the present disclosure disclosed in the present disclosure and the accompanying drawings are only examples proposed in order to easily describe the technical matters of the present disclosure and facilitate comprehension of the present disclosure, and do not limit the scope of the present disclosure. Therefore, in addition to the embodiments of the present disclosure, the scope of the present disclosure should be construed to include all modifications or modified forms drawn based on the technical idea of the various embodiments of the present disclosure, as defined by the appended claims and their equivalents.

What is claimed is:

1. A method of operating a first terminal, the method comprising:
   determining a motion of the first terminal by using sensor data from at least one sensor of the first terminal;
   performing a prediction for a channel quality between the first terminal and a second terminal based on the determined motion of the first terminal;
   determining at least one first time duration in which the predicted channel quality is greater than or equal to a threshold value and at least one second time duration in which the predicted channel quality is less than the threshold value; and
   transmitting, to the second terminal, data via a first transmission power, the first transmission power being set for the at least one first time duration.

2. The method of claim 1, further comprising:
   transmitting, to the second terminal, the data via a second transmission power, the second transmission power being set for the at least one second time duration.

3. The method of claim 2, wherein the second transmission power is greater than the first transmission power.

4. The method of claim 1, wherein the channel quality is an intensity of a reception signal from the second terminal.

5. The method of claim 1, further comprising:
   estimating the channel quality between the first terminal and the second terminal by receiving a signal from the second terminal; and
   compensating for the estimated channel quality by using the predicted channel quality.

6. The method of claim 1, wherein transmitting the data comprises:
   setting an electrical transmission power for transmitting the data according to the first transmission power; and
   allocating a resource for transmitting the data to the second terminal according to the set electrical transmission power.

7. The method of claim 2, further comprising:
   detecting whether the predicted channel quality for the at least one second time duration is less than the threshold value;
   setting the at least one second time duration as a non-transmission period;
   detecting whether the predicted channel quality for the at least one first time duration is greater than or equal to the threshold value; and
   setting the at least one first time duration as a transmission period.

8. The method of claim 1, further comprising:
   transmitting, to the second terminal, a reference signal; and
   receiving, from the second terminal, feedback channel quality information corresponding to the reference signal,
   wherein the feedback channel quality information is used for performing the prediction for the channel quality between the first terminal and the second terminal.

9. The method of claim 1, wherein the first terminal is in contact with a body of a user, and the second terminal is located within a predetermined distance from the first terminal.

10. The method of claim 7, further comprising:
    when the non-transmission period is greater than a predetermined period, transmitting data at a corresponding time point of the non-transmission period at the second transmission power.

11. A first terminal, comprising:
    at least one sensor;
    a channel quality prediction module configured to:
       determine the motion of the first terminal by using sensor data from the at least one sensor of the first terminal,
       perform a prediction for a channel quality between the first terminal and a second terminal based on the determined motion of the first terminal, and
       determine at least one first time duration in which the predicted channel quality is greater than or equal to a threshold value and at least one second time duration in which the predicted channel quality is less than the threshold value; and
    a wireless communication module configured to transmit, to the second terminal, data via a first transmission power, the first transmission power being set for the at least one first time duration.

12. The first terminal of claim 11, wherein the wireless communication module further configured to transmit, to the second terminal, the data via a second transmission power, the second transmission power being set for the at least one second time duration.

13. The first terminal of claim 12, wherein the second transmission power is greater than the first transmission power.

14. The first terminal of claim 11, wherein:
the channel quality is an intensity of a reception signal from the second terminal;
the first terminal is in contact with a body of a user; and
the second terminal is located within a predetermined distance from the first terminal.

15. The first terminal of claim 11, the channel quality prediction module is further configured to:
estimate the channel quality between the first terminal and the second terminal by receiving a signal from the second terminal; and
compensate for the estimated channel quality by using the predicted channel quality.

16. The first terminal of claim 11, wherein the wireless communication module is further configured to:
setting an electrical transmission power for transmitting the data according to the first transmission power; and
allocating a resource for transmitting the data to the second terminal according to the set electrical transmission power.

17. The first terminal of claim 12, wherein the channel quality prediction module is further configured to:
detect whether the predicted channel quality for the at least one second time duration is less than the threshold value;
set the at least one second time duration as a non-transmission period;
detect whether the predicted channel quality for the at least one first time duration is greater than or equal to the threshold value; and
set the at least one first time duration as a transmission period.

18. The first terminal of claim 11, wherein the wireless communication module is further configured to:
transmit, to the second terminal, a reference signal; and
receive, from the second terminal, feedback channel quality information corresponding to the reference signal,
wherein the feedback channel quality information is used for performing the prediction for the channel quality between the first terminal and the second terminal.

19. The first terminal of claim 17, wherein the channel quality prediction module is further configured to:
when the non-transmission period is greater than a predetermined period, transmit, to the second terminal, data at a corresponding time point of the non-transmission period at the second transmission power.

20. A first chip set, comprising:
a sensor module configured to detect a motion of the first chip set;
a channel quality prediction module configured to:
determine a motion of the first chip set by using sensor data from the sensor module of the first chip set,
perform a prediction for a channel quality between the first chip set and a second chip set based on the determined motion of the first chip set, and
determine at least one first time duration in which the predicted channel quality is greater than or equal to a threshold value and at least one second time duration in which the predicted channel quality is less than the threshold value; and
a wireless communication module configured to transmit, to the second chip set, data via a first transmission power, the first transmission power being set for the at least one first time duration.

* * * * *